United States Patent [19]

Tyson, II et al.

[11] Patent Number: 5,307,139
[45] Date of Patent: Apr. 26, 1994

[54] APPARATUS AND METHOD FOR DETECTING LEAKS IN PACKAGES

[75] Inventors: John Tyson, II, Wayne; John W. Newman, Berwyn, both of Pa.

[73] Assignee: Laser Technology, Inc., Norristown, Pa.

[21] Appl. No.: 820,403

[22] Filed: Jan. 15, 1992

Related U.S. Application Data

[63] Continuation-in-part of Ser. No. 574,809, Aug. 30, 1990, Pat. No. 5,082,366.

[51] Int. Cl.$^5$ .............................................. G01L 1/24
[52] U.S. Cl. .................................. 356/35.5; 356/353; 356/354; 356/347; 356/348
[58] Field of Search ................. 356/35.5, 353, 354, 356/347, 348

[56] References Cited

U.S. PATENT DOCUMENTS

| | | | |
|---|---|---|---|
| 2,591,666 | 4/1952 | Barkas et al. | 356/35.5 |
| 3,563,652 | 2/1971 | Powell | 356/32 |
| 3,802,758 | 4/1974 | Havener | 350/3.5 |
| 4,188,117 | 2/1980 | Yamauchi | 356/237 |
| 4,200,394 | 4/1980 | Bartlett | 356/347 |
| 4,382,679 | 5/1982 | Lee | 356/237 |
| 4,612,797 | 9/1986 | Barkhoudarian | 73/40.5 |
| 4,682,892 | 7/1987 | Chawla | 356/35.5 |
| 4,887,899 | 12/1989 | Hung | 356/35.5 |
| 5,082,366 | 1/1992 | Tyson et al. | 356/35.5 |

Primary Examiner—Samuel A. Turner
Assistant Examiner—LaCharles Reesee
Attorney, Agent, or Firm—William H. Eilberg

[57] ABSTRACT

This invention detects leaks in small, hermetically sealed packages, especially microchips or other packages of electronic circuits. The invention includes a procedure for detecting fine leaks, and a somewhat different procedure for finding gross leaks. To detect gross leaks, one places the package in a chamber, and varies the pressure in the chamber slightly. If the leak is not too big, one wall of the package, such as its lid, initially becomes deformed, but quickly returns to its original position, due to the leak. If the leak is very large, the wall of the package may not move at all. The position of the wall is monitored with an interferometer, such as an electronic shearography apparatus. The movements of the wall show whether there is a gross leak. In the fine leak test, the package is placed in the chamber and the pressure is changed substantially, thus causing the walls of the package to deform. If there is a fine leak, a deformed wall gradually returns to its initial position. Preferably, the chamber is pressurized with helium to increase the sensitivity of the test. The gradual return of the deformed wall can be measured by the interferometer, and the rate at which the wall returns to its starting position can be used to calculate the leak rate. In another embodiment, a single pixel of a series of interferometric images is analyzed to determine the number of times the pixel changes from a maximum to a minimum and back to a maximum. The latter number is related to the number of wavelengths of deformation, and can be used to compute the leak rate of the package.

29 Claims, 4 Drawing Sheets

1

APPARATUS AND METHOD FOR DETECTING LEAKS IN PACKAGES

CROSS-REFERENCE TO PRIOR APPLICATION

This is a continuation-in-part of U.S. patent application Ser. No. 07/574,809, filed Aug. 30, 1990, entitled "Apparatus and Method for Detecting Leaks in Packages".

BACKGROUND OF THE INVENTION

This invention relates to the field of testing of packages for leaks, especially the testing of small packages used to house electronic components. The invention can also be used in other applications, such as in the testing of sealed packages which contain food products or medical devices, or which contain components to be used in outer space.

Micro-electronic components are mounted within packages that must be hermetically sealed to prevent contamination of the fragile inner circuitry and the very fine interconnecting wires or circuit traces. The cavity inside the micro-electronic package is filled with a dry, inert gas, and typically a metallic lid is brazed to the package to provide the hermetic seal. Leakage of molecules of water or oxygen into the package cavity can corrode or oxidize the interconnecting wires to the point that the circuit fails. In many cases, the loss of one component can lead to the failure of a subsystem or the failure of an entire system. The reliability of every electronic control system therefore depends on the reliability of each hermetic seal of each component package.

In the prior art, it has been known to use "tracer" gases to detect fine leaks in microchips. Typically, one places a batch of electronic components into a chamber, and pressurizes the chamber with a gas such as helium or krypton-85. Then, one removes the components, and lets them sit for a short time, allowing excess gas to dissipate. Then, the amount of gas still leaking from the package is measured with a mass spectrometer or radiation detector. In this method, it is often necessary to keep the components within the chamber for several hours, depending on the desired sensitivity of the test and the package volume.

To detect gross leaks, it has been known to place a batch of components in a tank filled with liquid fluorocarbons, while an operator watches for tiny bubbles streaming out of specific packages.

One disadvantage of both of the above methods is that only discrete components can be inspected. Components mounted to completed circuit boards cannot be inspected because of the quantity of the components and because the circuit boards themselves release gases.

The present invention provides an optical method of detecting leaks in small packages. The invention preferably employs electronic shearography as the method of interferometry, thereby making it possible to obtain test results in "real time". The same apparatus used to detect gross leaks is also used to detect fine leaks, although the methods are somewhat different. Also, both tests can be performed on components mounted directly on a circuit board.

SUMMARY OF THE INVENTION

The apparatus of the present invention includes a chamber for holding the package to be tested, and a means for varying the pressure in the chamber. The apparatus also includes an interferometer for observing the displacement of a selected wall, or other surface, of the package being tested. Preferably, the interferometer is a device for practicing electronic shearography, and includes a computer and video display for obtaining results in "real time", and for making rapid calculations of leak rates.

The present invention includes a method for detecting gross leaks and another method for detecting fine leaks. In the gross leak test, the test package is placed in the chamber, and an initial interferometric image of a selected wall of the package is taken. The selected wall is normally the lid of the package. Then, the pressure in the chamber is varied slightly, and another interferometric image is taken. If the leak is so big that the package is essentially open to the outside, the walls of the package will not move at all. The second interferometric image will be essentially identical to the first. This result implies that there is a very large leak in the package. If the leak is not too great, the package wall will initially move slightly outward or inward (depending on whether the pressure in the chamber was decreased or increased). The second interferometric image will show that the wall has moved. Then, a sequence of further interferometric images is taken. If there is a gross leak, the wall will have returned to its initial position within a short time. The rate of displacement of the wall can be calculated, and, with knowledge of the other parameters of the package, the rate of movement of the wall can be translated into a leak rate.

In another embodiment of the gross leak test, the pressure in the chamber is made to vary at a known rate. This embodiment increases the reliability of the test, as it causes even non-leaking packages to deform.

In the fine leak test, the package is first placed in the chamber, and the pressure in the chamber is changed substantially, possibly by as much as an order of magnitude, or more. The walls of the container become deformed to a much greater extent than in the gross leak test. Then, a sequence of interferometric images is taken. If there is no leak, the deformed walls stay deformed, and there is no significant change in the position of the walls during a long period of time. If there is a fine leak, the walls will slowly return to their initial positions, at a rate which is directly proportional to the leak rate. Comparison of interferometric images taken at known intervals can be used to calculate the leak rate. The sensitivity of the fine leak test can be increased by performing the test in an atmosphere of pressurized helium.

In one embodiment, the apparatus for performing the interferometric analysis is located mainly outside of the test chamber. In another embodiment, at least a portion of the interferometric apparatus is located inside the chamber. Placing the interferometer inside the chamber has the advantage that it is not necessary for the laser beam to pass through a transparent cover of the test chamber, but it has the disadvantage in that a larger chamber is required.

It is also desirable to place a "control" package inside the chamber. The control package is a package which is known not to leak. Observation of the control package insures the accuracy of the test. It is also possible to use more than one control package, to insure that the first control package is not defective.

In another alternative embodiment, the leak test can be performed on a single pixel, or on a group of pixels, of a series of interferometric images of the test object.

The system determines how many times, during a test, the intensity of the selected pixel varies from a maximum to a minimum, and back to a maximum. The number of such cycles can be related to the total deflection of the package lid. Thus, the system is not dependent on any particular form of interferometry.

It is therefore an object of the invention to provide a method and apparatus for detecting leaks in packages, especially small packages used to house electronic components.

It is another object to provide a method and apparatus as described above, which method and apparatus are capable of detecting leaks in components mounted on circuit boards.

It is another object to provide a method and apparatus as described above, wherein the same apparatus can be used to detect fine leaks and gross leaks.

It is another object to provide distinct methods for detecting fine leaks and gross leaks in packages.

It is another object to provide a method of detecting leaks in a microchip, the method using electronic shearography to derive a real-time picture of the condition of the seal of the microchip.

It is another object to provide a method and apparatus as described above, wherein the results of the leak tests can be easily compared with the same tests performed on at least one "control" package.

It is another object to provide a method and apparatus for detecting leaks, wherein leaks can be detected reliably and without human error, and wherein the test results can be fully documented by recording of interferometric data.

It is another object to improve the efficiency with which interferometric data are analyzed, in determining leak rates, by limiting the analysis to those portions of a fringe pattern which represent points of maximum sensitivity.

Other objects and advantages of the present invention will be apparent to those skilled in the art, from a reading of the following brief description of the drawings, the detailed description of the invention, and the appended claims.

DETAILED DESCRIPTION OF THE INVENTION

In its most basic form, the method of the present invention comprises placing a batch of components into a chamber whose pressure can be varied, and observing the components with a full-field interferometer. When the pressure in the chamber is increased, the lid of each component will deform inward. When the pressure is decreased, the lid of each component will bulge outward. With the changed chamber pressure held constant, and if there is a leak in the seal of the lid, the internal pressure will eventually become equal to the external pressure, and the lid will return to its original position. The rate of movement of the lid is proportional to the leak rate of the seal. The optical interferometer measures the amount of deformation of the lid, and repeated measurements of this deformation yield the rate at which the lid returns to its initial condition. Although the leak test is described with respect to the package lid, throughout this specification, it is understood that the test could be practiced by observing some other surface, such as a side wall of the container. The invention is not limited to observation of the lid only.

Figure 1:
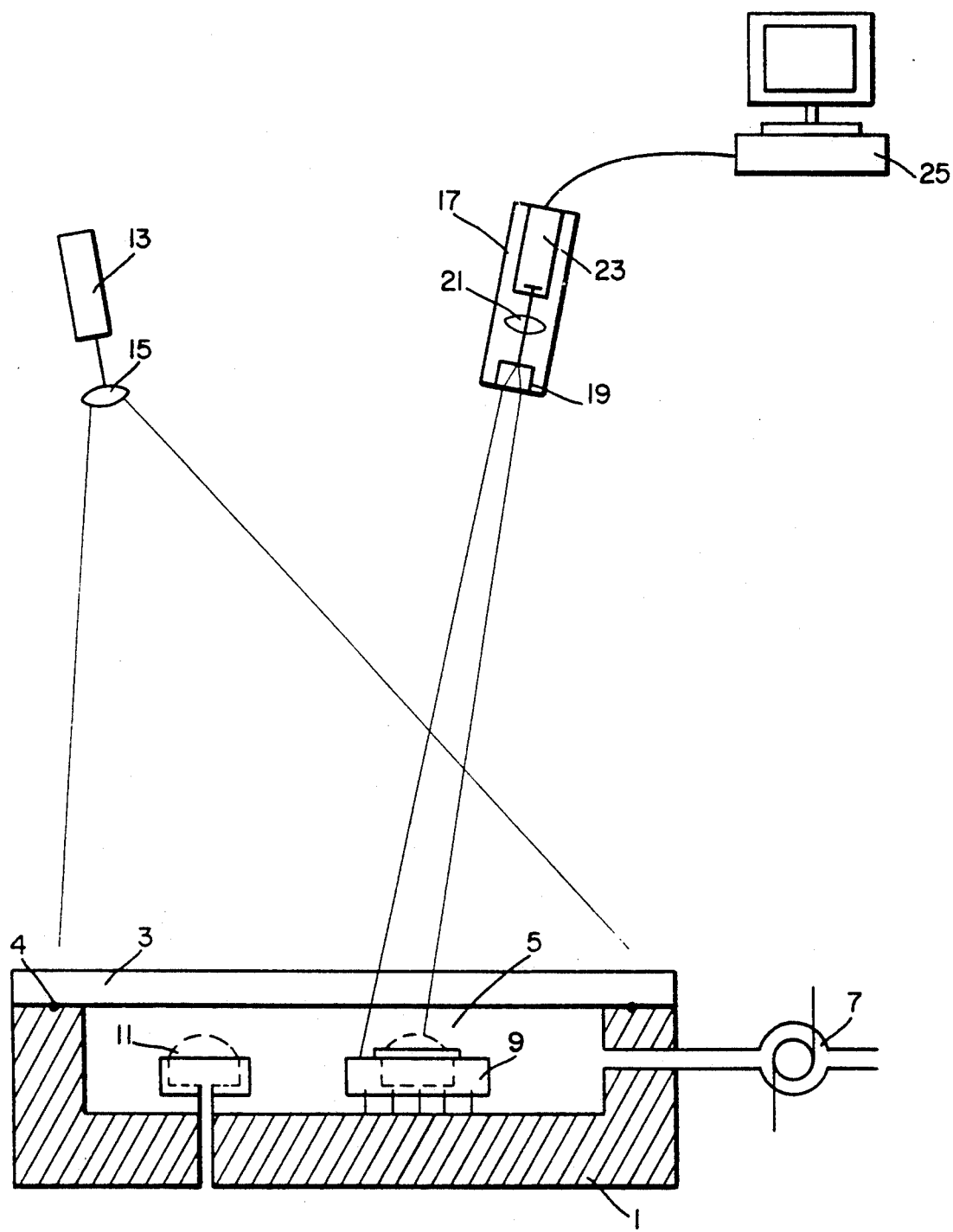
FIG. 1 is a schematic diagram of one embodiment of the apparatus used to practice the method of the present invention.

One embodiment of the apparatus for practicing the method of the present invention is shown schematically in FIG. 1. Housing I and transparent cover 3 define chamber 5. The cover, which may be made of glass or of another transparent material, is sealed to the housing by seals 4. The pressure in the chamber can be reduced or increased by pump 7. The package being tested, which is shown as microchip package 9, is placed within the chamber. A second package 11, of known integrity, is placed inside the chamber as a "control". The control package 11 should be a package that is known not to leak, and it should always be within the field of view of the camera which records the interferogram.

The behavior of a surface of the package, such as its top lid, is observed by an interferometric apparatus. The interferometric apparatus of FIG. 1 includes laser 13 and expanding lens 15. The system can also include filters (not shown) for properly controlling the characteristics of the light. For example, one can use a depolarizing filter if it is necessary that the light striking the object be unpolarized. Where the means of interferometry is the shearography apparatus described in U.S. Pat. No. 4,887,899, it is necessary that the light leaving the object be unpolarized, since the apparatus described in the latter patent includes a birefringent material that separates the light reflected from the object into two orthogonally-polarized rays. Laser light is typically polarized, and if the test object is metallic, the light reflected from the object will retain its polarization. The result would be a pair of rays of substantially unequal intensity, which would degrade the performance of the interferometer.

One can also use other types of filters, such as frosted glass, which could be used to assure a more even field of illumination.

Lens 15 causes laser light to illuminate the entire contents of the chamber. The apparatus can also operate without an expanded beam, especially when the object is relatively small, i.e. about 2 mm square. Since the diameter of a laser beam is typically about 1 mm, the unexpanded beam can adequately cover such a small object.

The interferometric apparatus also includes a device for generating interferograms which, in one embodiment, are shearograms. Thus, the interferometric apparatus includes a shearography camera 17 which has an optical element 19, a lens 21, a video camera 23, and a computer 25. The interferometric apparatus can be essentially the same as, or similar to, the apparatus described in U.S. Pat. No. 4,887,899, the disclosure of which is incorporated by reference herein. That is, the interferometer is an apparatus for practicing real-time electronic shearography. The apparatus can also be similar to the shearography unit described in U.S. patent application Ser. No. 07/528,474, filed May 25, 1990, entitled "Apparatus and Method for Performing Electronic Shearography", the disclosure of which is also incorporated herein.

The present invention is not limited to the use of shearography, and other interferometric techniques can be used. One such technique will be described in more detail below.

Figure 2:
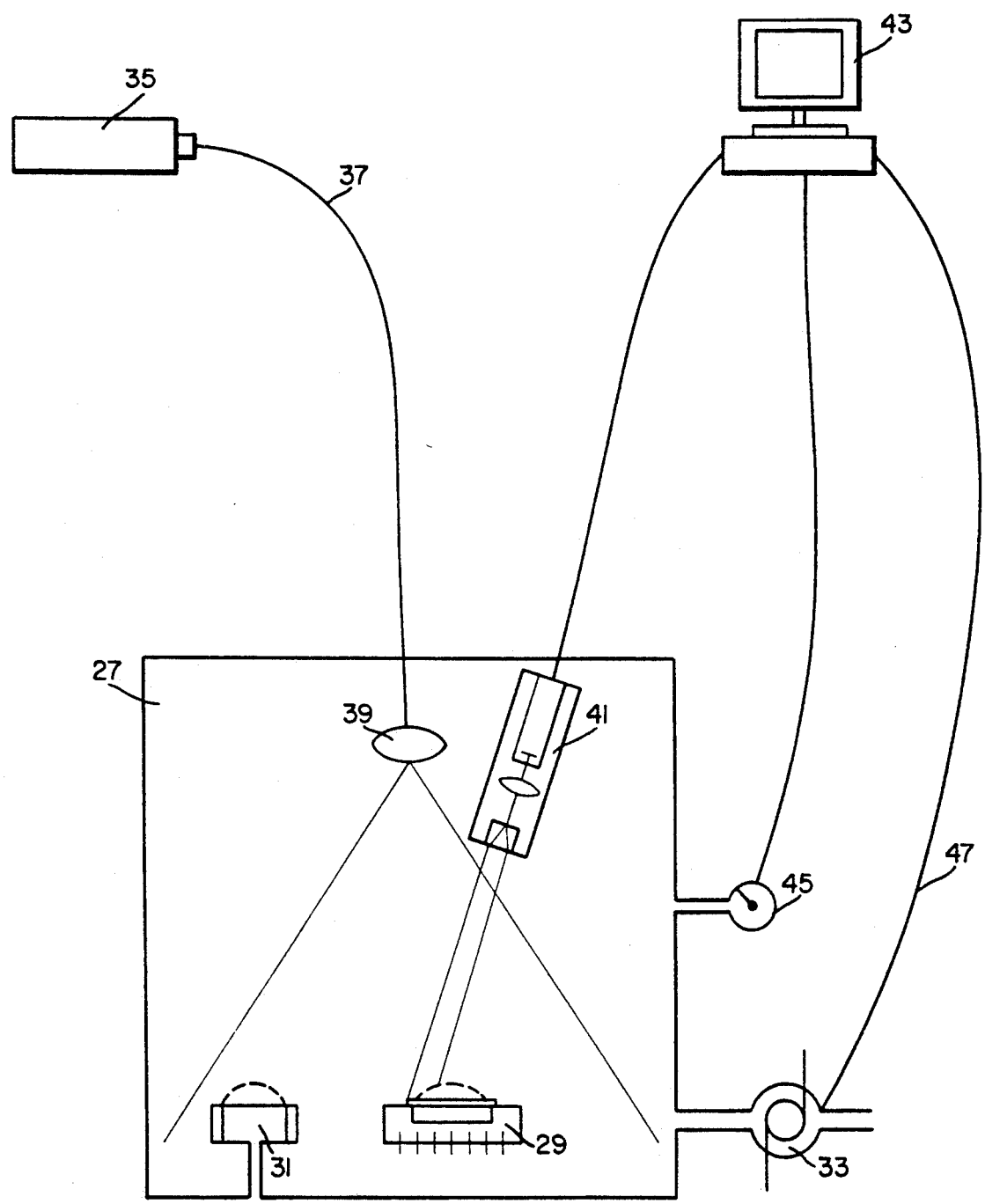
FIG. 2 is a schematic diagram of a second embodiment of the apparatus used to practice the method of the present invention.

FIG. 2 shows an alternative embodiment of the apparatus of the present invention. In FIG. 2, microchip package 29 and control package 31 are disposed within chamber 27. Pump 33 varies the pressure in the chamber. Laser 35 directs coherent light, through fiber optic cable 37, to an expansion lens 39, the expansion lens being located within the chamber. The cable makes it possible for the laser to be far from the test area, thus removing the electromagnetic and thermal noise that could be caused by the laser, and thus providing more stable operation. Shearography camera 41 is located within the chamber, and should be capable of operating in a vacuum environment. The camera should therefore provide for proper venting of the optical components, to prevent them from deforming, and must also provide for proper thermal transfer so that the camera's electrical components operate stably. The shearography camera can have the same internal components as camera 17 of FIG. 1. The output of shearography camera 41 is connected to computer 43. The apparatus also includes a pressure gauge 45, the output of which is connected to the computer, and a pressure control line 47, connected from the computer to pump 33. Thus, the apparatus of FIG. 2 includes a feedback loop by which the computer can control the pressure in the chamber. A similar pressure gauge and pressure feedback loop can also be provided in the embodiment of FIG. 1.

The principal difference between the embodiments of FIGS. 1 and 2 is that in FIG. 1, the shearography camera is located outside of the chamber, while in FIG. 2, the camera is inside the chamber. The advantage of the embodiment of FIG. 1 is that one can maintain a high or low pressure inside the test chamber while the camera and laser remain outside and are unaffected by the changed environment in the chamber. Thus, it is possible to use higher pressures in the chamber than can be withstood by the camera or the laser. On the other hand, the transparent cover must be very thick, so that it does not deform during the test. For this reason, the cover may produce undesirable optical "noise" distortion. The advantage of having the camera inside the chamber is that such noise is eliminated. The embodiment of FIG. 2 minimizes the number of times that the light must pass through the transparent cover. The main disadvantage of the embodiment of FIG. 2 is that it requires a large chamber. In FIG. 2, the chamber must not only be large enough to accommodate the camera, but it must also have enough space so that the camera is far enough from the package so that it can view the entire package or circuit board.

Note that it is also possible to use a fiber optic cable in the embodiment of FIG. 1. That is, the laser in FIG. 1 could also be placed a relatively large distance from the package. However, if a fiber optic cable is used, and the light thus emanates from a point inside the chamber, it would again be necessary to increase the size of the chamber, to enable the beam to expand before reaching the package. In the latter case, it would be possible to use higher chamber pressures, as such pressures would not affect the optical fiber.

The apparatus of FIG. 1 or FIG. 2 can be used to test for either gross or fine leaks. The following is a description of the procedure for testing for gross leaks.

First, the package to be tested is placed in the chamber, and a shearogram (or other kind of interferograms) is taken and recorded. The interferometric apparatus can generate an image representing the deformation of the entire lid of the package although, as will be explained later, one can restrict the analysis to those positions on the lid which are likely to show the greatest changes.

Then, the pressure in the chamber is increased or reduced slightly, and a second interferogram is taken and recorded. It is generally preferable to reduce the pressure, i.e. to create a partial vacuum in the chamber, but either alternative can be used. The amount by which the pressure is increased or reduced should be only that amount which is necessary to deform the package lid by a small integral number of wavelengths of the light used to obtain the interferogram.

Suppose, first, that the package has a hole which is quite large. This condition is equivalent to the situation in which the package has no lid at all. Then the second interferogram will be essentially the same as the first interferogram, because a change in pressure will not cause any deformation in the lid. The absence of a change between the first and second interferograms can be interpreted as the presence of a very large leak in the package.

Suppose, next, that there is a gross leak, but that the hole is not nearly as large as in the first case. Then, when the pressure in the chamber is varied slightly, the lid of the package will become deformed. Due to the gross leak, the lid soon returns to its original position as the pressures inside and outside the package become equal. The interferometer generates a sequence of interferograms, and the images of the latter sequence are compared with the first or second interferogram to determine the leak rate. Note that, if there is a leak, the subsequent interferograms will become more nearly identical to the first interferogram, and will become less correlated with the second interferogram.

In the gross leak test, it is preferable to wait for a short interval after taking the second interferogram, before taking the subsequent interferograms. This interval is typically several seconds, and should be long enough to insure that the lid has deformed sufficiently to create at least one interference fringe, but not long enough to allow the lid to return to its original position. Also, an interval is recommended because it is preferable to allow the air currents in the chamber, caused by the change in chamber pressure, to settle down into a steady-state condition.

In a second method for gross leak detection, the chamber pressure is initially changed substantially, such as to 26 inches of Hg ($-13$ psig). After one waits for a predetermined interval of time, one begins to gather the interferometric data. The chamber pressure is then increased at a constant rate, such as by allowing the vacuum to "leak" out of the chamber. Alternatively, the pressure in the chamber could be initially increased, the air in the chamber then being allowed to escape at a constant rate. If the package is not leaking, its lid will deform slightly, by a known amount, based on the lid stiffness and the amount of pressure change. This amount of deformation is specific for each type of package. If the package has a large leak (or if it does not even have a lid), there will be no observable deformation, and the package is known to be defective. If the package has a relatively small leak, the deformation measured by the interferometer will be much greater than the expected deformation caused by the known "leak" in the chamber. Thus, in the latter case also, the package is known to be defective.

The above-described alternative method has the advantage that it can be practiced in an automated manner, and can rapidly and reliably detect a package having a gross leak, for leaks which approach the "no lid" condition to leaks which approach the "fine leak" range.

The term "gross leak" is, of course, somewhat arbitrary, but it is usually defined to include packages which leak at a rate of more than $10^{-4}$ atm-cc/sec. A "fine leak" can therefore be defined to include packages which leak at a rate of less than $10^{-4}$ atm-cc/sec. Typically, leaks of less than $10^{-8}$ atm-cc/sec are considered too small to cause a problem in any system, and many standards define the latter rate as the limit for an acceptable hermetic seal.

The following is a description of the procedure for testing for fine leaks. The pressure in the chamber is varied substantially, possibly as much as an order of magnitude or more. More precisely, the amount of variation of pressure, for the fine leak test, should be sufficient to deform the package lid by many wavelengths of the light used to make the interferogram. While no specific amount of deformation is required, it is preferred that the lid be deformed through hundreds of wavelengths. The greater the amount of deformation, the more sensitive the test.

It is now assumed that the package has passed the gross leak test, and that the seal on the package is therefore sufficiently tight to cause the lid to become deformed. Because the pressure is varied by a large amount, the displacement of the lid is many times greater, possibly hundreds of times greater, than the displacement that occurred during the gross leak test. When the lid is first deformed, an interferometric image is taken. Then, a sequence of subsequent interferometric images is taken, over a period that may extend for several seconds, several minutes, or several hours. If there are no leaks whatever, the position of the lid will remain unchanged, and the interferometric images will be essentially identical. If there is a fine leak, the lid will slowly return to its original position. The rate of movement of the lid can be calculated by comparing the various interferometric images, and by analyzing the rate of deformation indicated in these images. From the rate of movement of the lid, and with knowledge of the parameters of the package, one can calculate the leak rate.

The sensitivity of the fine leak test can be further increased by performing the test in a pressurized helium atmosphere. The helium, having much smaller molecules than those of air, will leak into fine openings more quickly, increasing the test sensitivity and/or reducing the test time.

The fine leak test may not be feasible for all types of packages. For example, when the lid of the test package is made of a stiff material, such as a thick ceramic material, the lid may not be readily deformed. For lids made of very stiff materials, it may be necessary to rely on the gross leak test, either alone or in combination with some other technique, such as the test using krypton or helium, described above.

The present invention can sometimes be used in combination with the helium or krypton gas test. For very, very fine leaks, the method of the present invention is not practical because the rate of movement of the package lid, for a very fine leak, would be too small, and the test would take too long. The krypton or helium test, however, is very sensitive, and can be used to detect the smallest of leaks. The present invention, on the other hand, can be used for fine leaks that are not the smallest, and also for gross leaks, and can detect leaks which range in size as far as the "no lid" condition. The techniques of the prior art do not permit testing for gross and fine leaks with the same apparatus.

Determination of the leak rate, in both the gross leak and fine leak tests, depends on three parameters other than the measured rate of change of lid deformation. These parameters are 1) the amount of the test pressure, 2) the stiffness of the lid, and 3) the size of the internal cavity of the package.

The level of the test pressure is important because it determines the extent to which the lid deforms. The greater the pressure, the greater the stress on the lid, and the greater the flow through the suspected leak. Increasing the pressure increases the sensitivity of the test.

The stiffness of the lid is important because, as mentioned above, the stiffness affects the amount by which the lid deforms under the influence of a given pressure differential. The stiffness of the lid $L_c$ can also be measured directly to calibrate the apparatus automatically for the fine leak test for each package inspected. The pressure can be changed a small amount, preferably at the beginning of the test sequence, and the amount of resulting deformation can be determined from an equation given below.

The size of the internal cavity of the test package not only defines the lid area, but also determines the amount of gas trapped inside to deform the lid.

The above-described parameters are related according to the following equations which give the maximum deflection of the lid, and the leak rate of the package.

The lid stiffness is given by:

$$L_c = k_1 R^4 / E T^3 \qquad (1)$$

where
$L_c$ = lid stiffness (in/psi),
$k_1$ = lid stiffness geometry factor,
R = minimum internal lid width (in),
E = modulus of elasticity (psi),
T = lid thickness (in).

The lid deformation is given by:

$$dY_t = L_c(dP_p - dP_c) \qquad (2)$$

where
$dY_t$ = change in deformation (inches),
$L_c$ = lid stiffness (in/psi), from Equation (1),
$dP_p$ = change in package internal pressure (psi),
$dP_c$ = change in chamber pressure during test (psi).

The leak rate is given by:

$$dP_p = P_c[1 - exp(-t L k_2/V_o)] \qquad (3a)$$

or $$L = (-V_o/k_2 t) \ln (1 - dP_p/P_c) \qquad (3b)$$

where
L = leak rate of the package (cc/sec), $dP_p$ = change in package internal pressure (psi), from Equation (2)
t = time duration of test (sec)
$k_2$ = leak test gas constant (vacuum = 1.0, He = 2.67)
$V_o$ = volume of package cavity (cc)
$P_c$ = pressure of chamber during test (psig).

These equations are used consecutively and culminate in the leak rate equation that provides the package's leak rate in atm-cc/sec. First, the computer can calculate (by Equation (1)) or directly measure the package's lid stiffness by changing the pressure by a known amount and measuring the resultant deformation.

In calculating the leak rate, the computer measures the change in lid deformation from the data gathered during the test. The change in deformation is related to the change of internal pressure $dP_p$ (see Equation (2)), and the change of internal pressure is then used to determine the leak rate L, in cc/sec (see Equation (3)). The sensitivity of the test is directly related to the stiffness of the lid, $L_c$, and the pressure differential used.

It is assumed, in this test, that the internal pressure of the package is ambient pressure, which is a realistic assumption if the package leaks. If the package leaks, the interior would have reached atmospheric pressure; if the package does not leak, the above equation would not be strictly true, but the method would give correct qualitative results, since the lids would deform under pressure.

A change in dY causes a change in the interference pattern produced by the interferometer. The computer which is connected to the interferometry camera can count the number of interferometric fringes moving past a given point, to determine the change in dY. The latter result can be used in the above equation to determine the leak rate of the package.

It is advantageous to use electronic shearography as the interferometric method, because electronic shearography makes it possible to generate and analyze interference patterns easily by computer. Thus, given the specific parameters of the package, the computer can directly and automatically calculate the leak rate of the package. Electronic shearography has the additional advantage that it is relatively immune to effects of external sources of noise and vibration. With electronic shearography, a real-time pattern can be observed directly by the operator of the system, or the interference patterns can be interpreted automatically by the computer.

The control package 11 (or 31) can be used to detect leaks in the chamber. The behavior of the control package can be used both qualitatively and quantitatively. In a qualitative test, one can simply observe whether the lid of the control package changes position after the pressure in the chamber has been set. If so, the chamber must be leaking, and the test results can be voided. In a quantitative test, one can apply the above equation for dY in reverse, i.e. by solving for $P_c$, to confirm the assumption that the pressure in the chamber has not changed.

It is also possible that the chamber may be leaking, but only at a small rate. By observing the movement of the lid of the control package, and with knowledge of the parameters of the control package, one can calculate the leak rate of the chamber. This leak rate can then be taken into account in computing the leak rate of the test package. The leaking of the chamber can also be used to identify a good package, since the package would not deform otherwise.

The control package can be simply a light metallic diaphragm welded to a solid base material with a cavity, the diaphragm being similar in size to the lid of an actual microchip package, and preferably similar in size and shape to the lid of the package being tested. In practice, however, no package is absolutely leakproof. The cavity of the control package is therefore preferably made relatively large so that any small leaks in the control package will not have a large effect on the lid deformation. The larger the cavity, the more sluggish the deformation of the lid, and the less significant is the leak in the control package as compared with that of the chamber. It is also possible to vent the interior of the control package to the outside of the chamber, in order to establish firmly that the interior pressure of the control package is at ambient pressure. FIGS. 1 and 2 show the control package being vented to the outside.

To insure that the control package is indeed leakproof, one can provide two or more control packages, all known to be non-leaking, within the same test chamber. With more than two control packages, it is unlikely that all such packages will be leaking, and it is virtually certain that they will not all leak at the same rate.

In monitoring the differential deformation of each package lid, it is helpful to concentrate on the area of the lid that is most sensitive to changes in pressure. A calculation "window" can be placed over this sensitive portion of the image. The window location or locations can be geometrically calculated from the position and size of the package lid, located by the operator, or located automatically by the computer using "machine vision" techniques.

Figure 3:
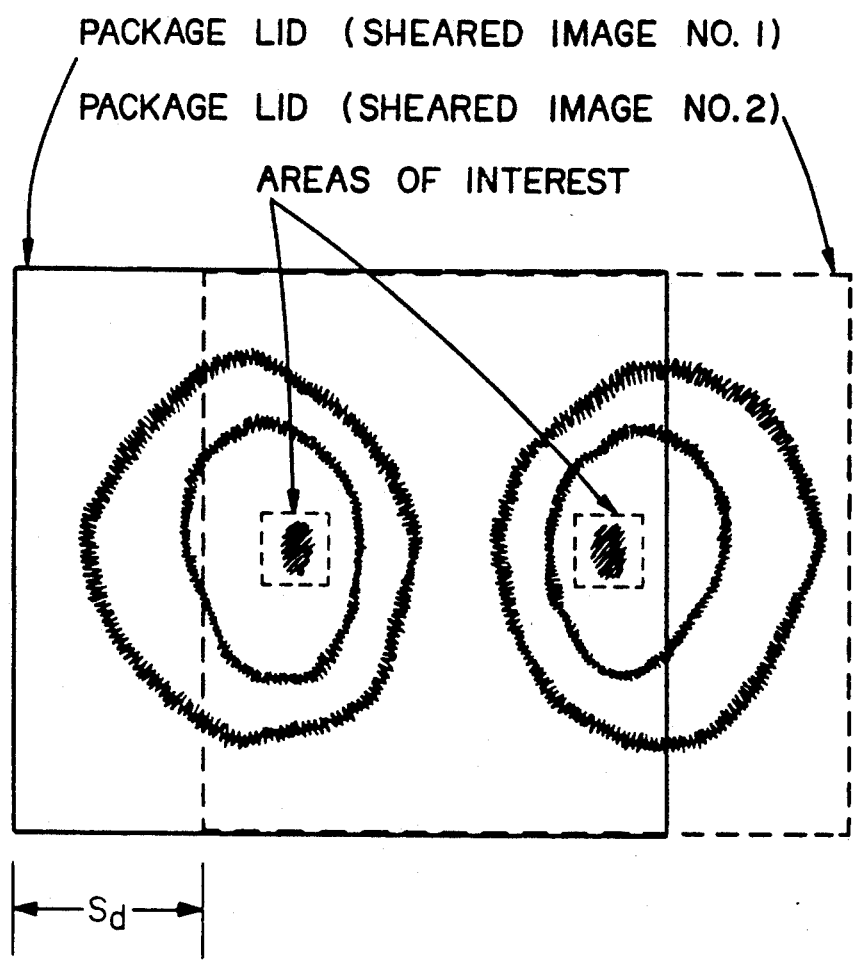
FIG. 3 is a diagram showing a typical fringe pattern which is obtained through electronic shearography, the diagram also indicating the regions of maximum interest on the pattern.

When the interferometric technique is shearography, the most sensitive points occur at two places on the lid. FIG. 3 shows a typical pattern produced by electronic shearography. This pattern is the combination of two shearograms, each shearogram being an interference pattern formed from the superposition of two laterally-displaced images of an object. The pattern of FIG. 3 is therefore electronically generated; the fringes are not produced directly through optical interference, but are instead the result of subtracting (or otherwise mathematically comparing) two optically-generated shearograms. Nevertheless, it turns out that the fringe pattern is directly related to the original image from which the pattern is derived. A more detailed discussion of the subtraction (or other combination) of shearograms to form such composite interference patterns is given in U.S. Pat. No. 4,887,899, cited above.

The important point illustrated by FIG. 3 is that the present invention makes it possible to select an area of interest, on the package being tested, to minimize the time required for analysis. In general, the areas of interest are those portions of the package lid which move through the greatest numbers of wavelengths of light for a given amount of deformation of the lid. By focusing on these areas, one can detect small movements in the lid more readily than by examining other areas.

In the shearographic technique described in U.S. Pat. No. 4,887,899, cited above, the pattern obtained comprises sets of concentric fringes. These sets of concentric fringes are shown in FIG. 3. The center of each set of fringes comprises a point of interest. These points of interest are the points of maximum sensitivity, described above. The rectangles drawn around the points of interest represent the "window" discussed above.

It turns out that if the amount of shearing is very small, the points of interest comprise the points of maximum strain on the lid. As the amount of shearing increases, the locations of the centers of the fringe patterns shift from the points of maximum strain to the points of maximum deformation. When the amount of shearing is equal to one-half the dimension of the lid, the points of interest coincide with points of maximum deformation of the lid. As the amount of shearing is increased beyond this level, the points of interest continue to be the points of maximum deformation.

Thus, one way to determine the areas of interest is to inspect the patterns visually. One can obtain a shearogram of the lid, and can focus attention on those regions near the centers of the concentric fringes obtained in the shearogram. However, this visual method has the disadvantage that it may be necessary to take at least one additional shearogram; one pattern would be taken to determine the areas of interest, and another pattern would then be taken to conduct the actual test. The mathematical method described below is therefore usually more practical.

The following is a description of one method by which the computer can use the shearographic data represented in FIG. 3 to choose the area of interest automatically.

When one takes a first shearogram, one forms two laterally displaced interfering images of the same object. These images are designated as $Y_{1i}$ and $Y_{2i}$. The subscript "i" means "initial", and the subscripts "1" and "2" refer to the two laterally-displaced images that are made to interfere with each other. Similarly, when one takes a second shearogram, after deforming the object, the resulting images are $Y_{1f}$ and $Y_{2f}$, where the subscript "f" means "final". Each individual shearogram is the superposition of the pair of images, and the composite pattern is obtained by comparing the two shearograms, as explained in U.S. Pat. No. 4,887,899. Thus, the composite pattern, which will be called $Y_s$, can be written as $$Y_s = (Y_{1i} + Y_{2i}) - (Y_{1f} + Y_{2f}).$$

By rearranging terms, one obtains:
$$Y_s = (Y_{1i} - Y_{1f}) - (Y_{2f} - Y_{2i}).$$

But the expressions $(Y_{1i} - Y_{1f})$ and $(y_{2f} - Y_{2i})$ are really the displacements of the first and second images of the pair. Therefore, we can replace these expressions with equations for the deflection of the lid, similar to the equation for $Y_m$, shown above, by reference to principles of the theory of elasticity. That is, we can write $$Y_s = Y_1 - Y_2$$

where
$Y_s$ = the shearographic deflection,
$Y_1$ = the deflection of the first image, and
$Y_2$ = the deflection of the second image.

The lateral displacement between the two images, i.e. the amount of shearing, is also known as the "shear dimension" and will be called sdIn In order to determine the points of interest, one must replace the terms in the above equation with expressions which represent the deformation of the lid. Then, one solves the above equation for its extremum points. The extremum points comprise the locations of the areas of interest. It turns out that these areas coincide with the centers of the two patterns of concentric fringe lines which appear in a typical shearogram.

By analogy to the equation for $Y_m$, given previously, for the maximum deflection of the lid, one can write the following expressions for $Y_s$) $Y_1$, and $Y_2$:

$$Y_1 = [CP/Et^3] x^2 (R - x)^2$$
$$Y_2 = [CP/Et^3] (x + S_d)^2 (R - S_d - x)^2$$
$$Y_s = [CP/Et^3] [(x + S_d)^2 (R - S_d - x)^2 - x^2 (R - x)^2]$$

where
x = linear position, in inches,
P = pressure differential, in psi,
E = modulus of elasticity,
t = lid thickness (inches),
R = smaller side of rectangular cavity (inches),
C = constant = 0.22, and
$S_d$ = shearing dimension, in inches.

In this analysis, we assume that the shearing is performed in the x direction. Thus, for the first image, x = O could be the beginning of the lid; for the relatively sheared image, $s_d$ would be the beginning of the lid.

The shearographic centers equation is then written without the gain constant as:

$$Y_s = (x + S_d)^2 (R - S_d - x)^2 - x^2 (R - x)^2$$

If one solves $Y_s$ for its extremum points, which can easily be done in the above example, one obtains the center of the locus of points comprising each set of fringes. The center of the innermost fringe is the point of maximum interest. The computer can therefore be programmed to locate this point, without operator intervention. The computer can also solve for the points at which $Y_s$ equals an integral number of half-wavelengths, which determines the location of each set of fringes.

As explained above, the method of the present invention includes storing an initial interferometric image (whether taken before or after pressurization), obtaining a sequence of further interferometric images, and comparing the latter images with the initial image. There are many ways to perform this comparison. One way is discussed below.

The window over each area of interest is composed of a matrix of pixels for each frame f of the real time image. We define the correlation coefficient for frame f by the following equation:

$$C_f = 1 - \Sigma |(I_f - I_i)| / (\Sigma I_f + \Sigma I_i)$$

where
$C_f$ = correlation between frame f and frame i, the initial frame; perfect correlation is indicated by a value of 1;
$I_i$ = intensity of a particular pixel in the initial image; and
$I_f$ = intensity of a corresponding pixel in frame f, and where $\Sigma$ indicates a summation over all the pixels in the particular window.

When $C_f$ is plotted against time (which is equivalent to plotting against the frame number), one obtains a curve of "decorrelation". The term "decorrelation" is used because when the effects of a leak have not yet become apparent, the second images of the lid will be virtually perfectly correlated with the first image. As the pressures equalize, due to the leak, and the lid moves, the correlation between subsequent images and the first image will decrease. Thus, when a package begins to leak, subsequent frames become "decorrelated" from the initial condition of near perfect correlation.

Figure 4:
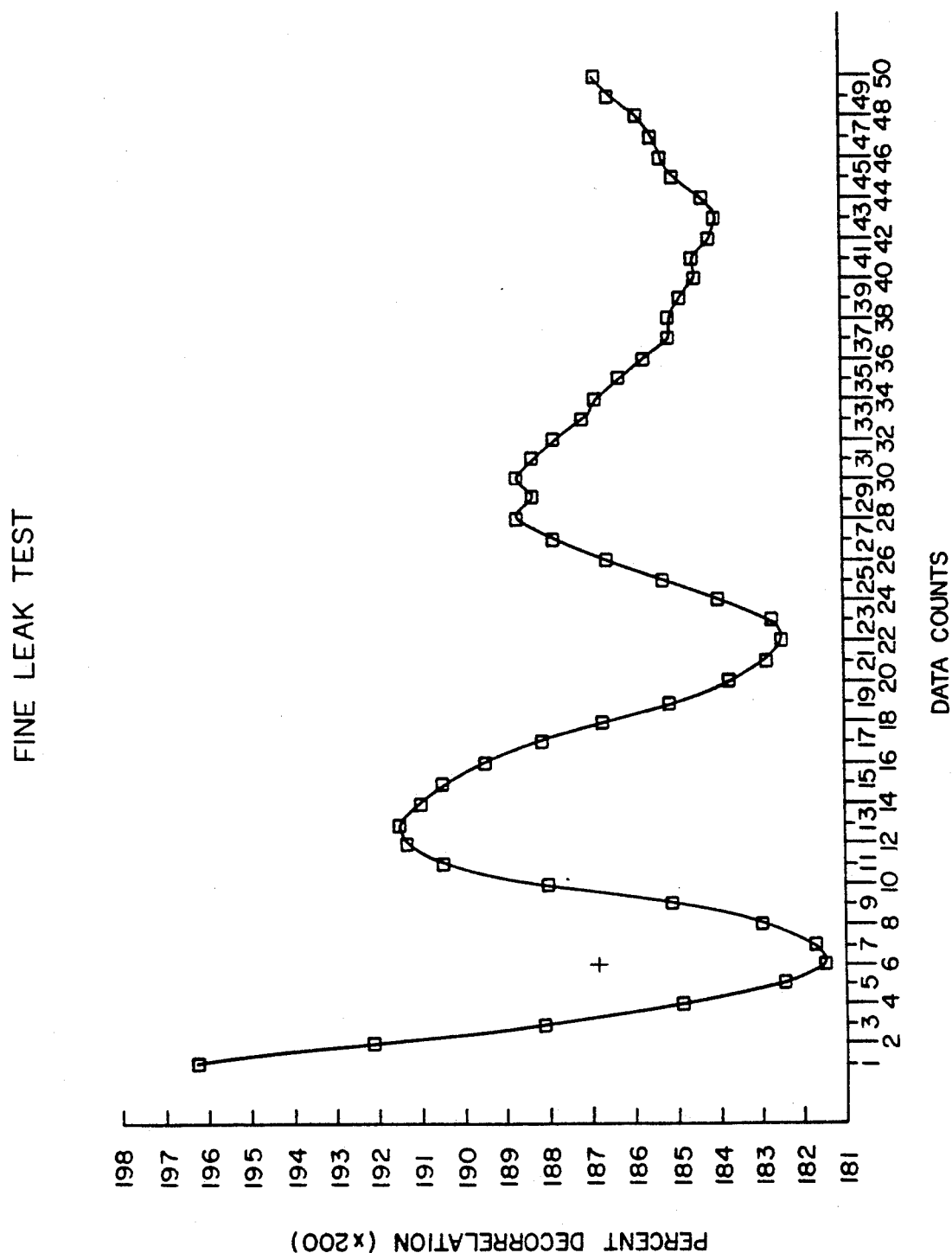
FIG. 4 is a graph showing the variation in an interferometric pattern, during an interval of time, the graph giving information about the fine leak rate of a package.

FIG. 4 shows a sample graph of the above-defined correlation function over time for a typical leak test. In the test summarized in FIG. 4, the pressure in the chamber was changed from ambient pressure to 7 inches of mercury (−3.5 psig), and held for ten seconds. The entire test then lasted about 20 seconds. The resulting curve of decorrelation is approximately sinusoidal. The slope of the curve is directly related to the rate of change of the lid deflection $Y_m$ as the package leaks. The computer can calculate a measured leak rate based on the instantaneous slope of the curve, and then, using the specific parameters of the package, can calculate the actual leak rate of the package. This analysis can be performed on each package in the field of view at near real-time speeds, with each test taking approximately one minute. Each inspection could include analysis of an entire circuit board or of a tray of discrete components. Thus, the method of the present invention represents a vast improvement over the leak testing methods of the prior art.

Another alternative to the embodiments described above makes the invention easily workable with interferometric techniques other than shearography. In this alternative embodiment, the interference patterns are not compared by a subtraction technique as described above. Instead, the apparatus analyzes one or more individual corresponding pixels of a series of interferometric images, and records the intensity values for each of the pixel(s) being analyzed, as the test proceeds. The intensity of each pixel varies, across the series of images, from constructive interference (maximum intensity) to destructive interference (minimum intensity) and back to constructive interference, as the observed surface deforms. In this embodiment, the computer simply analyzes the data for a particular pixel (i.e. for a set of corresponding pixels from the series of images) to determine the minimum and maximum intensity values, and then determines the number of times the intensity has changed from maximum to minimum and back, during a given interval of time. A change from one maximum to the next corresponds to one wavelength of change in deformation. Thus, by adding the number of wavelengths of deformation, and by knowing the wavelength of the laser light used, the computer can calculate the total deformation of the surface during the given interval of time.

Thus, in the latter technique, each pixel of the image (more precisely, each set of corresponding pixels of a series of images) can be considered a separate interferometer. The same kind of analysis performed formed for one pixel can also be done for neighboring pixels to confirm the results obtained from the primary pixel.

In the alternative discussed above, when one speaks of a single pixel, one really means a set of pixels, one pixel from each of a series of images, the pixel from each image corresponding directly to the pixel from every other image.

In the alternative discussed above, it is therefore not necessary to subtract two complete images from each other. This alternative embodiment has an advantage over holography or full-field shearography, because the latter techniques produce images which may degrade if a test requires more than several minutes. In the pixel-by-pixel analysis, each individual pixel can be tracked indefinitely. Also, it is only necessary to measure the deformation of a single pixel, although additional pixels can be tracked to increase the reliability of the results.

If, in this latter technique, shearing optics are used, the pixels that are used are chosen by the shearographic centers equation, given above. The amount of shearing also affects the sensitivity of the test. The shear sensitivity $S_s$ is related to the ratio of the shear dimension $S_d$ and to the width of the lid R. This shear sensitivity relates the measured wavelength to the laser wavelength, as shown in the equation below. When the amount of shearing is equal to or greater than one-half the lid dimension, $S_s = 1$.

$$\lambda_{sL} = 2 S_s \lambda_x$$

When the amount of shearing is equal to or greater than one-half the lid dimension, the measured interferometric wavelength $\lambda_s$ is equal to one half the laser wavelength $\lambda_L$. This means that when a point of the interferometric image goes from constructive to destructive interference and back again, one wavelength, the lid has moved one-half of a wavelength of the laser light used, or $1.25 \times 10^{-5}$ inches for a Helium-Neon laser with a wavelength of 632.8 nm. As the amount of shearing decreases with respect to R, $S_s$ becomes less than 1. This fact has been determined experimentally, as shown in the following table:

| Shear Sensitivity vs. $R/S_d$ | |
| --- | --- |
| $R/S_d$ | $S_s$ |
| 2 | 1.0 |
| 4 | 0.699 |
| 8 | 0.376 |
| 10 | 0.303 |
| 20 | 0.153 |
| 40 | 0.077 |

While the invention has been described with respect to particular embodiments, it is understood that variations can be made. The arrangement of the apparatus of FIG. 1 or FIG. 2 can be changed. The number of control packages can be varied. Also, although interferometry is considered to be the best method for measuring slight displacements of the package lid, other techniques for measuring such displacements could be used. For example, one can use a pulse-echo technique, using either pulses of electromagnetic energy or acoustic pulses, to detect accurately the position of a point on the lid. Thus, the invention can therefore be modified considerably, and such modifications should be deemed within the spirit and scope of the following claims.

We claim:

1. A method of inspecting a package for gross leaks, the method comprising the steps of:
   a) placing the package in a chamber,
   b) varying the pressure in the chamber by an amount sufficient to deform a surface of the package by a small integral number of wavelengths of light,
   c) recording an interferometric image of the surface of the package,
   d) waiting for an interval of several seconds,
   e) varying the pressure in the chamber at a known rate, while simultaneously recording a series of second interferometric images of the surface observed in step (c),
   f) comparing the second images with the image of step (c) to determine whether the surface has moved during the interval of step (d), and g) determining whether the package is leaking by analyzing movement of said surface.

2. The method of claim 1, wherein the comparing step is performed with respect to only a portion of the surface of the package, and wherein said portion is near a region of maximum interferometric response on the surface.

3. The method of claim 1, wherein steps (a) through (f) are simultaneously performed on the package being inspected and on at least one control package.

4. The method of claim 1, further comprising the step of calculating a leak rate based on the amount by which the surface has moved during said interval.

5. The method of claim 1, wherein step (e) comprises the step of allowing gas within the chamber to leak out of the chamber at a known 6. A method of inspecting a package for gross leaks, the method comprising the steps of placing the package in a chamber, and varying the pressure in the chamber at a known rate, while simultaneously recording a series of interferometric images of a surface of the package, comparing said images with each other to determine how much the surface has moved, and determining whether the package is leaking by analyzing movement of said surface.

7. A method of inspecting a package for fine leaks, the method comprising the steps of:
a) placing the package in a chamber,
b) varying the pressure in the chamber by an amount sufficient to deform a surface of the package by a large number of wavelengths of light,
c) recording a first interferometric image of the surface of the package, after completion of step (b),
d) recording a series of second interferometric images of the surface observed in step (c),
e) comparing the second images with the first image to detect changes in displacement of the surface while said second interferometric images are being recorded, and
f) determining whether the package is leaking by analyzing the changes in displacement of said surface, wherein the chamber is pressurized with helium before the second interferometric images are recorded.

8. The method of claim 7, wherein the comparing step is performed with respect to only a portion of the surface of the package, and wherein said portion is near a region of maximum interferometric response on the surface.

9. The method of claim 7, wherein steps (a) through (e) are simultaneously performed on the package being inspected and on at least one control package.

10. The method of claim 7, further comprising the step of calculating a leak rate based on the amount by which the surface moves during step (e).

11. A method of inspecting a package for leaks, the method comprising the steps of:
a) placing the package in a chamber,
b) varying the pressure in the chamber by an amount sufficient to deform a surface of the package by a small integral number of wavelengths of light,
c) generating a series of interferometric images of at least a portion of the surface, during an interval of time, each image including at least one pixel,
d) determining the number of times that a given pixel changes from a maximum to a minimum to a maximum intensity, during said interval of time, and using said number to determine the deformation of the surface during said interval, and
e) determining whether the package is leaking by analyzing the deformation of said surface.

12. The method of claim 11, wherein the portion of the surface in step (c) is near a region of maximum interferometric response on the surface.

13. The method of claim 11, wherein steps (a) through (d) are simultaneously performed on the package being inspected and on at least one control package.

14. The method of claim 11, wherein the chamber is pressurized with helium.

15. The method of claim 11, wherein the method is repeated for at least one other pixel of the image.

16. The method of claim 11, further comprising the step of changing the pressure in the chamber, at a known rate, while step (c) is being performed.

17. The method of claim 16, wherein the pressure in the chamber is varied by allowing gas to leak out of the chamber.

18. A method of inspecting a package for leaks, the method comprising the steps of placing the package in a chamber, varying the pressure in the chamber, generating a series of interferometric images of at least a portion of the surface, during an interval of time, each image including at least one pixel, determining the number of times that a given pixel changes from a maximum to a minimum to a maximum intensity, during said interval of time, using said number to determine the deformation of the surface during said interval, and determining whether the package is leaking by analyzing the deformation of said surface.

19. The method of claim 18, wherein the chamber is pressurized with helium.

20. The method of claim 18, wherein the method is repeated for at least one other pixel of the image.

21. The method of claim 18, further comprising the step of changing the pressure in the chamber, at a known rate, while the images are generated.

22. A method of determining the stiffness of a surface of a package, the method comprising the steps of:
a) placing the package in a chamber,
b) generating a series of interferometric images of at least a portion of the surface, during an interval of time, each image including at least one pixel,
c) varying the pressure in the chamber at a known rate, so as to deform the surface of the package by a small integral number of wavelengths of light, and
d) determining the number of times that a given pixel changes from maximum to minimum to maximum intensity, during said interval of time, and using said number to determine the deformation of the surface of the package, and
e) determining whether the package is leaking by analyzing the deformation of said surface.

23. The method of claim 22, wherein said portion of the surface is near a region of maximum interferometric response on the surface.

24. The method of claim 22, wherein steps (a) through (d) are simultaneously performed on the package being inspected and on at least one control package.

25. The method of claim 22, wherein the package is inspected for gross leaks at the same time, by determining that the deformation of the surface did not reach an expected value for given package specifications.

26. A method of inspecting a pressurized package for leaks, the method comprising the steps of:

a) generating a series of interferometric images of at least a portion of the surface, during an interval of time, each image including at least one pixel, and b) determining the number of times that a given pixel changes from maximum to minimum to maximum intensity, during said interval of time, and using said number to determine the deformation of the surface during said interval, and c) determining whether the package is leaking by analyzing the deformation of said surface.

27. The method of claim 26, wherein said portion of the surface is near a region of maximum interferometric response on the surface.

28. The method of claim 26, wherein steps (a) and (b) are simultaneously performed on the package being inspected and on at least one control package.

29. A method of measuring fine movements or deformations of a surface, the method comprising the steps of:

a) generating a series of interferometric images of at least a portion of the surface, during an interval of time, each image including at least one pixel, and b) determining the number of times that a given pixel changes from maximum to minimum to maximum intensity, during said interval of time, and using said number to determine the travel or deformation of the surface during said interval.

* * * * *